Sept. 20, 1932.  W. H. TEETSOW  1,878,651
MILK EVAPORATOR
Filed Oct. 26, 1931
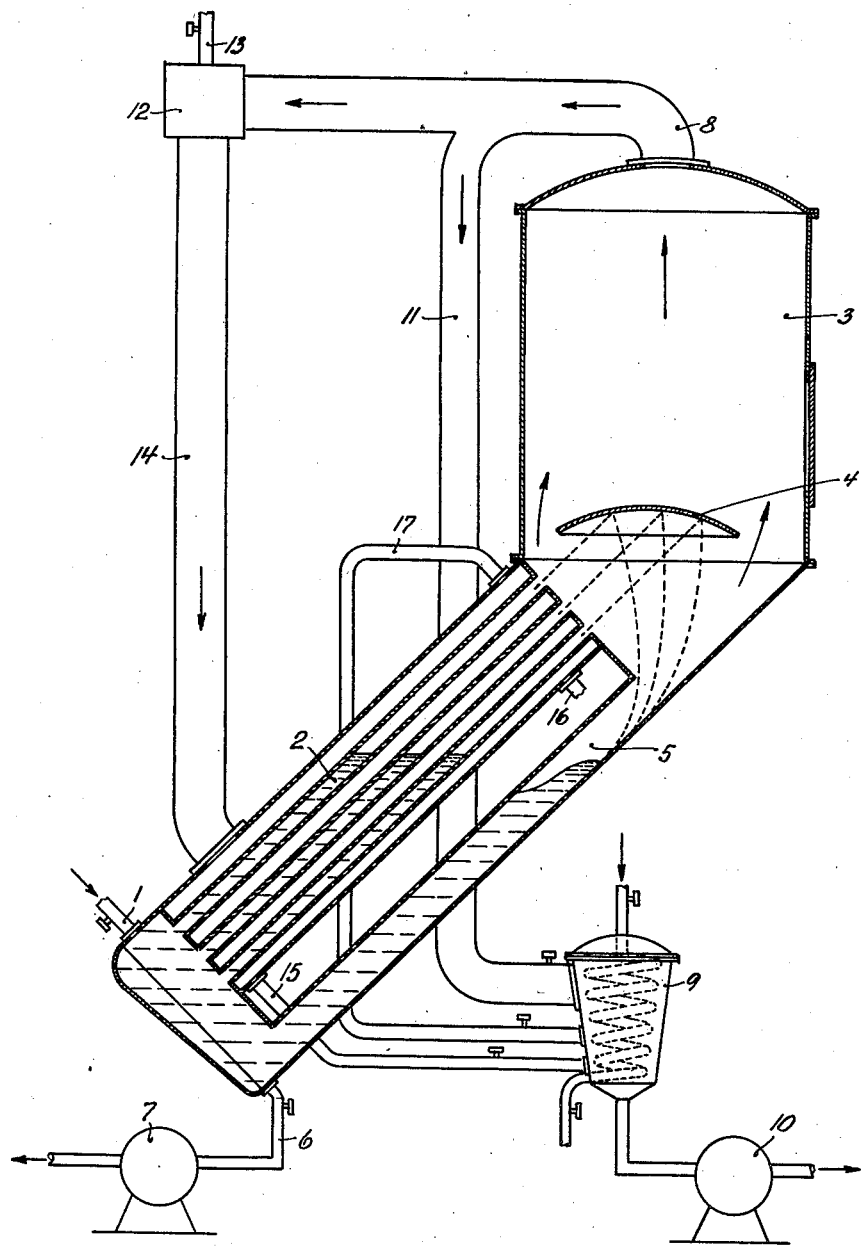
Witnesses
Inventor:
W. H. Teetsow
By: Marks Clark
Attys.

Patented Sept. 20, 1932

1,878,651

UNITED STATES PATENT OFFICE

WALDEMAR HENRY TEETSOW, OF BUFFALO, NEW YORK

MILK EVAPORATOR

Application filed October 26, 1931, Serial No. 571,257, and in Esthonia November 7, 1930.

In the industry milk evaporators are known, by which the milk is gradually evaporated, in an obliquely disposed heating body connected to the vapour collector, by means of steam sweeping about the pipes of the heating body, the steam or so-called "vapour" formed thereby being condensed in a condenser and removed by means of a pump, while the thickened milk is pumped away for further treatment. Similarly known are arrangements according to which such evaporators are combined and work together in such a manner that the evaporation of milk can also be effected continuously. All these evaporators, however, are subject to the drawback that the working steam used cannot be freed of air, for which reason the air and the non-condensed gases contained in the steam will have a heat-insulating effect and therefore, no full utilization of the heating body is possible.

The present invention has for its object to remove this drawback, and at the same time, owing to a suitable piping arrangement, the invention allows a continuous evaporation of milk to be effected even when only one single milk separator is used at a time.

According to the invention an obliquely disposed heating body is connected to a vertically disposed steam or rather vapour collector, from where this vapour is drawn into a thermo-compressor, where it is compressed by means of a jet of live steam and thus brought to a higher pressure, whereafter it enters the heating body once more as working steam. Besides there is provided, in the shape of a pipe connected to the top side of the heating body, a device serving to free the working steam from air as well as from other non-condensable gases, the air and gases collecting at this point, perhaps together with a small part of the working steam, being discharged in consequence of a jet of steam produced by a suitable pump. Cooperating with this pipe is another pipe connecting the bottom of the heating body with the condenser through which condensate together with heavy gases pass into the condenser to be subsequently discharged by the pump.

The accompanying drawing shows, by way of example, one construction of a milk evaporator according to the invention.

The maybe preheated milk or other liquid to be evaporated is filled by way of an inlet 1 into an obliquely disposed evaporator proper 2, where it adjusts itself to a definite level. Outside of the tubes filled with milk the boiler is filled with steam, which causes the milk to evaporate. After the entry of the steam, bubbles of vapour are formed in the milk, which bubbles while ascending promote the circulation of the milk to be evaporated, whereby any formation of foam will be prevented. Hereby the vapours formed strike against the plate 4 disposed transversely at the bottom of the vapour collector 3, by means of which plate the not fully evaporated more concentrated milk will be deposited and thereby freed from vapour, whereafter the said milk flows away in the return pipe 5 and then again joins the circulation through the apparatus. By way of the pipe 6 and pump 7 the condensed milk is sucked away, maybe to a device for further treatment. The "vapour" formed from the water contained in the milk, on the other hand, is sucked past the plate 4 by means of the thermo-compressor 12, and ascends through the vapour collector into the pipe leading to the compressor 12, collector 3 and is discharged by way of the pipe 8.

According to the usual process the vapour pipe 8 would be connected directly to a condenser 9 and pump 10 for the purpose of removing the vapour fast enough and for being able to maintain the desired vacuum in the vapour separator.

According to the present process only a part of the vapour from the vapour pipe 8 is directed to the condenser 9 by way of the pipe 11, while the main mass of the vapour enters into a thermo-compressor 12, where it is compressed by means of a jet of live steam introduced by way of the inlet 13 and, under pressure increased thereby, enters together with the live steam into the heating body by way of the pipe 14 for the purpose of serving as heating steam to cause evaporation of the milk.

Owing to the thus effected multiple utilization of the vapours a reduced consumption of live steam is attained, and the evaporator may operate discontinuously as well as also continuously, when the supply of milk is always adjusted according to the discharge of the condensed milk.

Since, as mentioned above, free air and other non-condensed gases are always present in the live steam—which especially is the case for milk or other liquids forming foam by boiling—the said air and gases will act as heat-insulation between the steam and the milk containing tubes: they will prevent contact between the said tubes and the pure steam and, thereby, the transfer of heat from the steam to the milk that is to be evaporated. As this air and non-condensed gases have a lower specific weight than the steam, they will mainly stay in the upper part of the heating body. Here at top is now provided a discharge pipe 17, the other end of which is also connected to the condenser 9. By way of this discharge pipe 17 the non-condensed gases and the air are thus discharged together with a small quantity of the live steam. Any heavy gases present in the live steam will sink to the bottom accelerated by the water of condensation formed and will be discharged, together with the latter, to the condenser by way of the pipe 15. In this manner the capacity of the evaporator will be raised considerably, because only pure steam acts on the tubes and, consequently, the heating capacity of the heating body is utilized in considerably more rational manner.

In contradistinction to the higher pressure of the live steam usual in the heretofore known milk evaporators, the milk evaporator according to the invention operates exclusively with steam considerably below the atmospheric pressure, whereby the injurious and otherwise always occurring burning of milkstone to the tubes will be avoided entirely. Owing to this circumstance each working period of the evaporator is increased considerably, since any frequent cleaning may be dispensed with.

Without transgressing the frames of the invention various deviations from the construction illustrated by way of example on the drawing may of course be made. Besides, the various controlling devices not represented on the drawing may be provided, such as milk gauges, vacuum and pressure gauges etc. Details may also be constructed in other manner. The condenser may for instance be built with a device for injection of cooling water, but if—as shown on the drawing—it is fitted with a serpentine cooler, then the same may also be used for preheating the milk. Owing to the vacuum existing in the heating body also exhaust steam taken may be from the pumps or from elsewhere may be used, which exhaust steam might then be introduced into the heating body by way of the inlet 16.

Having now described my invention, what I claim as new and desire to secure by Letters Patent is:—

An evaporating apparatus for milk and the like products requiring low boiling temperature comprising an inclined steam chest including a shell, end plates and tubes extending through the shell and the plates, a chamber at the lower end of the chest and in communication with the tubes, means for introducing milk into the chamber, an upright vapor separator situated at the top of the chest and in communication with the tubes, a deflecting plate in the separator above the tubes, a return pipe between the separator and the liquid receiving chamber, a live steam supply, a thermo-compressor in communication with the live steam supply and having its suction side in communication with the vapor separator and its discharge side in communication with the shell of the steam chest to compress vapors from the boiling liquid by means of live steam to produce a heating steam for the purpose of evaporating water from the milk, a condenser in communication with the vapor separator and acting to create a vacuum, a pump in communication with the condenser for ensuring of the withdrawal of the condensed vapors from the condenser and pipes between the top and bottom of the shell of the steam chest and the condenser for withdrawing air and other non-condensable gases from the steam chest, means for withdrawing condensed milk from the chamber, and means for adjusting the quantity of milk introduced continuously into the evaporator to correspond to the quantity of condensed milk discharged in order to allow continuous working.

In testimony whereof I affix my signature.

WALDEMAR HENRY TEETSOW.